US010921154B2

(12) United States Patent
Doshi et al.

(10) Patent No.: US 10,921,154 B2
(45) Date of Patent: Feb. 16, 2021

(54) MONITORING A SENSOR ARRAY

(71) Applicant: Hewlett Packard Enterprise Development LP, Houston, TX (US)

(72) Inventors: Parag Doshi, Marietta, GA (US); Satwant Kaur, Mountain View, CA (US); Babak Makkinejad, Troy, MI (US); Corey Wick, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 429 days.

(21) Appl. No.: 15/746,003

(22) PCT Filed: Jul. 22, 2015

(86) PCT No.: PCT/US2015/041589
§ 371 (c)(1),
(2) Date: Jan. 19, 2018

(87) PCT Pub. No.: WO2017/014775
PCT Pub. Date: Jan. 26, 2017

(65) Prior Publication Data
US 2018/0216960 A1 Aug. 2, 2018

(51) Int. Cl.
*G01D 3/08* (2006.01)
*G01D 18/00* (2006.01)
*G01D 21/00* (2006.01)

(52) U.S. Cl.
CPC ............. *G01D 3/08* (2013.01); *G01D 18/008* (2013.01); *G01D 21/00* (2013.01)

(58) Field of Classification Search
CPC ......... G01D 3/08; G01D 18/008; G01D 21/00
See application file for complete search history.

(56) References Cited

U.S. PATENT DOCUMENTS

| 536,988 A | 4/1895 | Fritz |
| 8,536,878 B2 | 9/2013 | Andarawis et al. |
| 8,849,926 B2 | 9/2014 | Marzencki et al. |

(Continued)

OTHER PUBLICATIONS

Babitski, G. et al.; "Ontology-based Integration of Sensor Web Services in Disaster Management"; Sep. 28, 2009; 19 pages.

(Continued)

*Primary Examiner* — Regis J Betsch
*Assistant Examiner* — Jeremy A Delozier
(74) *Attorney, Agent, or Firm* — Tong, Rea, Bentley & Kim, LLC

(57) ABSTRACT

In example implementations, an apparatus is provided. The apparatus includes an interface, an inheritance engine, an anomaly detection module and a processor. The interface communicates with a sensor array. The inheritance engine is used to create a model of the sensor array based on information collected from the each one of a plurality of nodes in the sensor array over the interface. The anomaly detection engine is used to monitor the sensor array in accordance with the model to detect an anomaly and initiate a corrective action to correct the anomaly in two or more of the plurality of nodes within the sensor array simultaneously. The processor is in communication with the inheritance engine and the anomaly detection engine is used to execute instructions associated with the inheritance engine and the anomaly detection engine.

9 Claims, 4 Drawing Sheets

(56) References Cited

U.S. PATENT DOCUMENTS

| | | | |
|---|---|---|---|
| 2003/0151513 A1 | 8/2003 | Herrmann et al. | |
| 2006/0253570 A1 | 11/2006 | Biswas et al. | |
| 2007/0028219 A1* | 2/2007 | Miller | G05B 23/021 |
| | | | 717/124 |
| 2008/0141754 A1 | 6/2008 | Kates | |
| 2009/0222541 A1 | 9/2009 | Monga et al. | |
| 2009/0259411 A1* | 10/2009 | Loomis | G01B 7/16 |
| | | | 702/35 |
| 2010/0161283 A1* | 6/2010 | Qing | G01N 29/2475 |
| | | | 702/188 |
| 2014/0222521 A1* | 8/2014 | Chait | G06Q 10/0637 |
| | | | 705/7.36 |
| 2014/0359552 A1 | 12/2014 | Misra et al. | |

OTHER PUBLICATIONS

Birman, K.P. et al.; "Scalable, Self-organizing Technology for Sensor Networks"; Jun. 15, 2004; 16 pages.

International Searching Authority, The International Search Report and the Written Opinion, Mar. 25, 2016, PCT/US2015/041589, 14 Pgs.

Pathan, M, et al.; "Semantics-based Plug-and-play Configuration of Sensor Network Services"; Oct. 15, 2010; 16 pages.

* cited by examiner

MONITORING A SENSOR ARRAY

BACKGROUND

Sensors have a limited lifespan. Environmental conditions will cause sensors to deteriorate, batteries will fail, and technology will rapidly make the sensors outdated. Most assume that once a sensor array is implemented and connected to a wide area network that the array, and the value derived from the sensor array, will continue in perpetuity.

DETAILED DESCRIPTION

The present disclosure discloses a method, system and apparatus for monitoring a sensory array. As discussed above, many sensor management systems only contemplate management of each sensor individually. However, it is not just the individual sensors that will fail. The entire sensor array may fail without a cost-effective means of managing the lifecycle of the individual sensors. In addition, each sensor may be dependent on other sensors within the sensor array. As a result, a change or failure of one sensor can affect the operation of other sensors within the sensor array. Manually performing the management of each sensor and the entire sensor array is not cost effective or efficient.

Examples of the present disclosure provide a method for monitoring a sensor array. For example, an entire array of sensors may be monitored and managed. In other words, when a single sensor fails or malfunctions, the effect of the single sensor on the entire array may be analyzed. Based on the analysis, adjustments to other sensors that have a dependency on the failing sensor may be proactively made. In addition, when new sensors are added, the new sensors may be configured in accordance with how they fit into the sensor array and adjustments may be made to other sensors to account for the addition of the new sensors. Furthermore, when a system under test (SUT) of the sensory array changes, the sensors may be automatically updated to properly monitor the new SUT.

Figure 1:
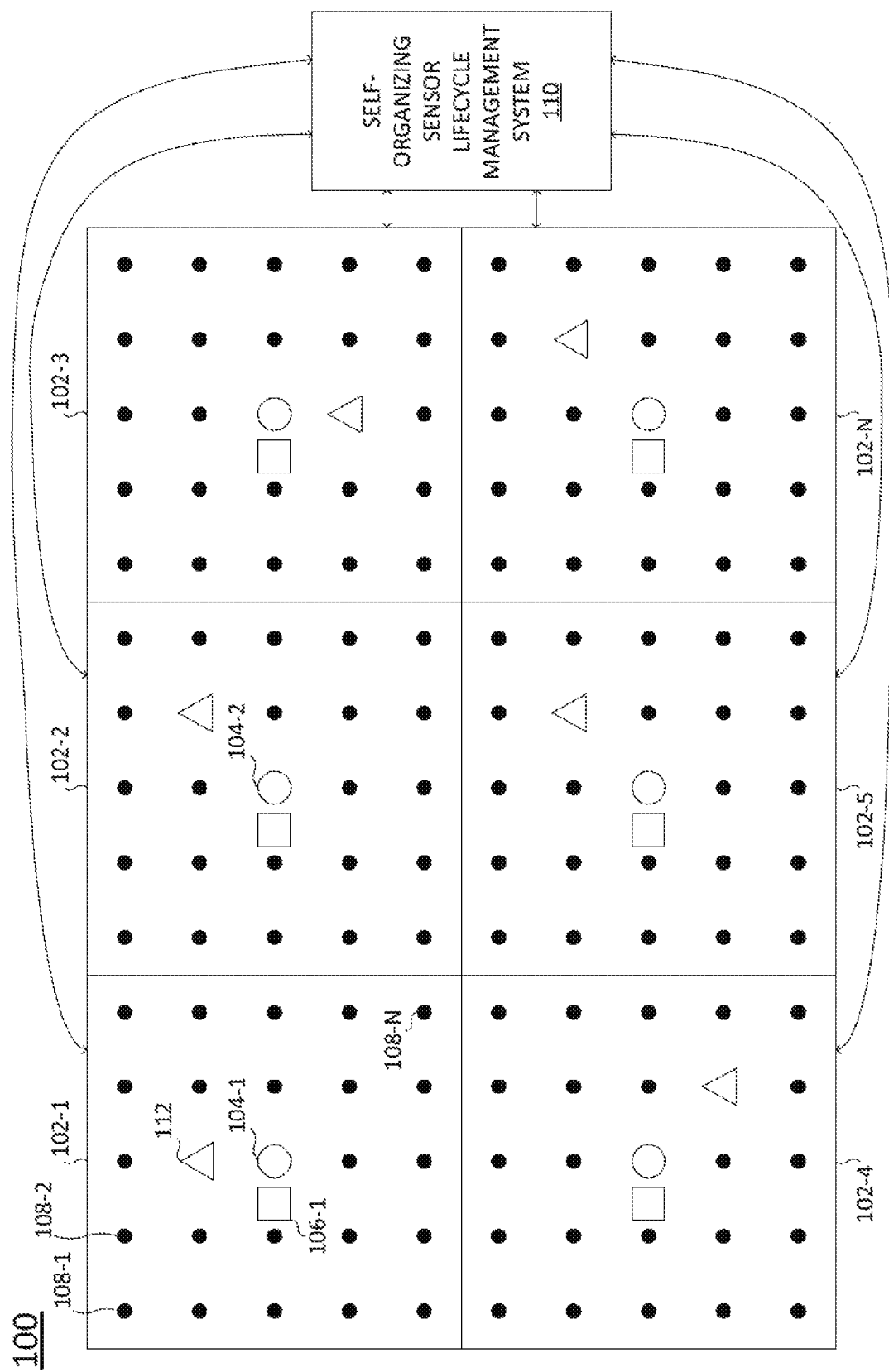
FIG. 1 is an example system of the present disclosure.

FIG. 1 illustrates an example system 100 of the present disclosure. In one example, the system 100 includes sensor arrays 102-1 to 102-N (herein referred to individually as a sensor array 102 or collectively as sensor arrays 102) and a self-organizing sensor lifecycle management system 110 (also referred to herein as management system 110).

In one example, each one of the sensor arrays 102 may include a remote control 104, a router 106, a plurality of sensors 108-1 to 108-N (herein referred to individually as a sensor 108 or collectively as sensors 108), and a system under test (SUT) 112. In one example, the plurality of sensors 108 and the SUT 112 may be referred to as a plurality of nodes of the sensor array 102. In other words, the sensory array 102 may include a plurality of nodes, wherein each node is a sensor 108 or an SUT 112.

In one example, the remote control 104 may execute instructions (e.g., commands, configuration changes, calibration, and the like) on each sensor 108 within a respective sensor array 102. For example, the remote control 104 may communicate wirelessly with each one of the sensors 108 within a sensor array 102.

In one example, the remote control 104 may serve as a back up to an adjacent or neighboring sensor array 102. For example, if the remote control 104-2 in the sensor array 102-2 were to fail, the remote control 104-1 can be used to execute instructions for the sensors 108 in the sensor array 102-2.

In one example, the remote control 104 of each one of the different sensor arrays 102 may operate on a different frequency to ensure that a remote control 104-1 in the sensor array 102-1 does not accidentally control or change a sensor 108 in the sensor array 102-2. However, the frequency of a remote control 104 can be changed to operate within a frequency of another sensor array 102 to serve as a back-up, as discussed above.

In one example, the router 106 may provide communications between the sensor array 102 and the management system 110. In one example, the router 106 may communicate over a wide area network (WAN) (e.g., using a cellular access network, a broadband access network, and the like).

In one example, the sensors 108 may be low cost devices that are used to measure data or detect an event related to the SUT 112. The sensors 108 may include different types of sensors. For example, some of the sensors 108 may measure temperature, some sensors may measure humidity, some sensors 108 may track inventory of a first item, some sensors 108 may track inventory of a second item, some sensors 108 may detect motion, some sensors 108 may detect presence of a particular chemical, and the like. The types of data or parameters that are measured or events that are detected may be a function of the SUT 112 that the sensors 108 are monitoring.

In one example, the sensors 108 may include short range wireless communication ability. The sensors 108 may be equipped to exchange information discreetly or continuously depending on the power architecture of the sensors 108. The sensors 108 may communicate with a respective remote control 104, as discussed above.

In one example, the SUT 112 may be an appliance (e.g., a refrigerator), a vehicle, a warehouse, a retail location, a farm, and the like. In one example, the SUT 112 may also be in communication with the remote control 104 via a short range wireless communication capability. The sensors 108 may be configured to monitor the SUT 112. Data and information may be continuously collected by the sensors 108 and transmitted to the management system 110.

Figure 2:
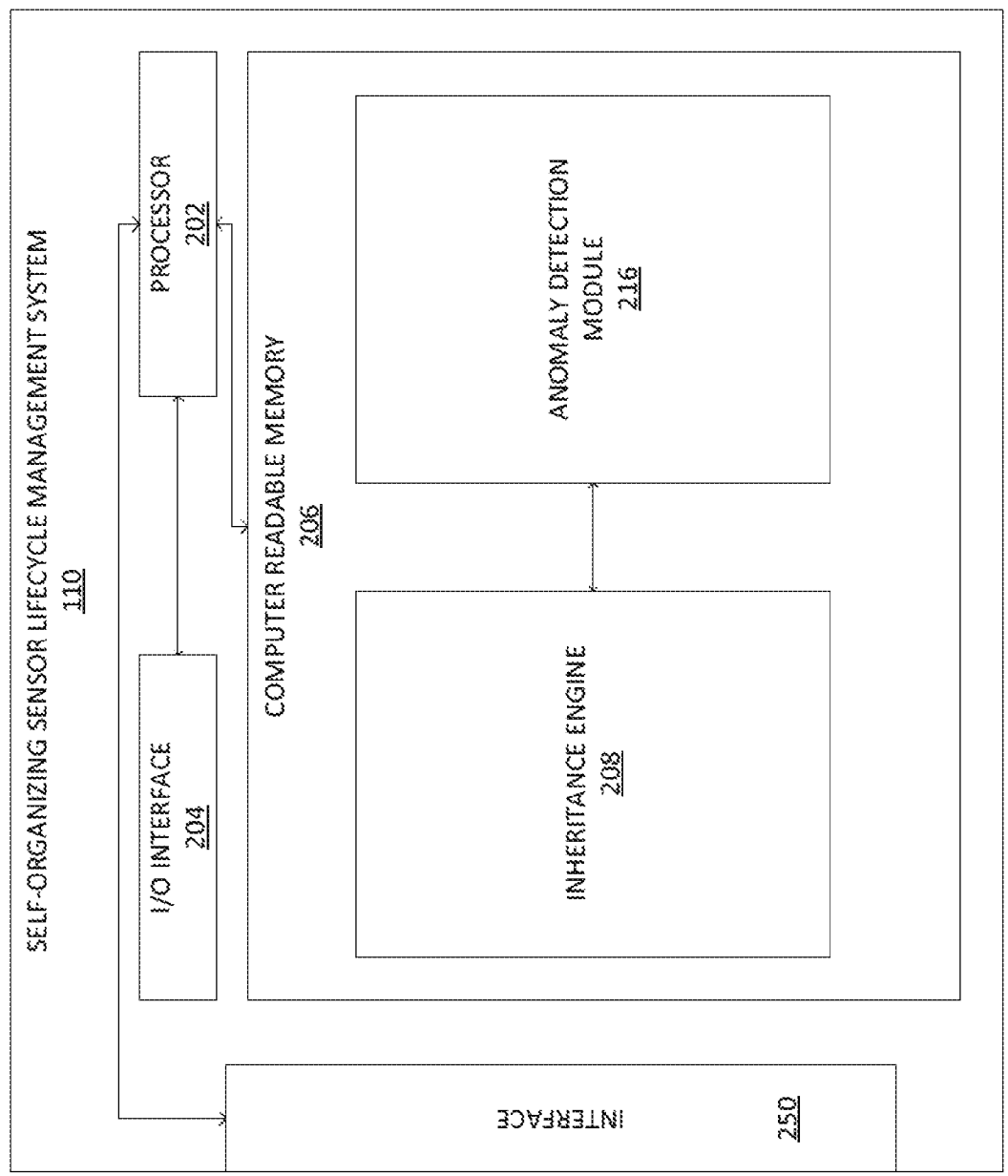
FIG. 2 is a block diagram of an example self-organizing sensor lifecycle management system.

FIG. 2 illustrates a block diagram of the self-organizing sensor lifecycle management system 110. In one example, the management system 110 may include a processor 202, an input/output (I/O) interface 204, a computer readable memory 206 and an interface 250 for communicating with the sensor arrays 102. In one example, the I/O interface 204 may include a user input device (such as a keyboard, a keypad, a mouse, a microphone, and the like), a receiver, a transmitter, a speaker, a display, a speech synthesizer, an output port, an input port, and the like.

In one example, the processor 202 may include multiple hardware processor elements. Furthermore, although only one processor 202 is shown in FIG. 2, the functions described herein may be implemented in a distributed or parallel manner for a particular illustrative example (e.g., using multiple processors 202 or multiple management systems 110).

In one example, the computer readable memory 206 may include non-transitory computer readable storage mediums such as hard disk drive, a random access memory, and the like. In one example, the computer readable memory 206 may include an inheritance engine 208 and an anomaly detection module 216.

In one example, the management system 110 may include a single interface 250 to communicate with all of the arrays 102. In another example, the management system 110 may include separate interfaces 250 for each array 102-1 to 102-N.

In one example, the inheritance engine 208 may be used to create a model of each sensor array 102 based on information collected from each one of the nodes (e.g., the sensors 108 and the SUT 112) in the sensor array 102. The inheritance engine 208 may also be used to configure and calibrate each one of the sensors 108 based on various sensor types, rules and context.

In one example, the anomaly detection module 216 may be used to monitor the sensor arrays 102 in accordance with the model created by the inheritance engine 208. The anomaly detection module 216 may monitor the sensor arrays 102 to detect anomalies or errors in the sensor array 102 and initiate a corrective action to correct the anomalies or errors. In one example, the anomaly in two or more of the nodes within a sensor array may be corrected simultaneously with a single corrective action initiated by the anomaly detection module 216.

In one example, the anomaly detection module 216 may detect errors in a single sensor 108. However, the anomaly detection module 216 may detect errors in the sensory array 102 based upon the operation of a few of the sensors 108 even if the sensors are not malfunctioning.

For example, a percolation threshold may be used to determine or to detect an error in the sensor array 102. In one example, the percolation threshold may be based on a total number of sensors 108 in the sensor array 102. For example, the larger the sensor array 102, the larger the percolation threshold and vice versa. In one example, the percolation threshold may be represented by $\eta_c$. In one example, the percolation threshold may be calculated by the following Equation (1):

$$P(s|\eta)s^{\tau-2} \sim A + AB(\eta-\eta_c)s^{\sigma}, \qquad (1)$$

where $P(s|\eta)$ is a probability of generating a cluster size greater than s at a specified $\eta$, A and B are constants and $\tau$ and $\sigma$ are universal exponents. For a 2D array of sensors, the values of $\tau$ and $\sigma$ are 187/91 and 36/91, respectively. For a 3D array, the values are 2.18906+/−0.00006 and 0.4522+/−0.0008, respectively.

In one example, for a 2D sensor array 102 where the sensors 108 are aligned in parallel to each other, the percolation threshold $\eta_c$ may be $\eta_c$=1.098+/−0.001. In another example, for a 2D sensor array 102 where the sensors 108 are oriented randomly, the percolation threshold $\eta_c$ may be $\eta_c$=0.9819+/−0.0006.

To illustrate, if a number of sensors 108 are detected as having an error, then the entire sensor array 102 may be malfunctioning and all, or a large number, of the sensors 108 in the sensor array 102 may need to be recalibrated or reconfigured. In another example, if a number sensors 108 greater than the percolation threshold may be detected as having data that is out of range. In other words, the sensor is functioning properly, but the data may be suspect (e.g., an anomaly is detected). As a result, the number of sensors 108 detected as having data out of range may be above the percolation threshold and the entire sensor array 102 may be determined to be malfunctioning. A corrective action may be initiated and each sensor 108 of the sensor array 102 may be recalibrated or reconfigured.

Figure 3:
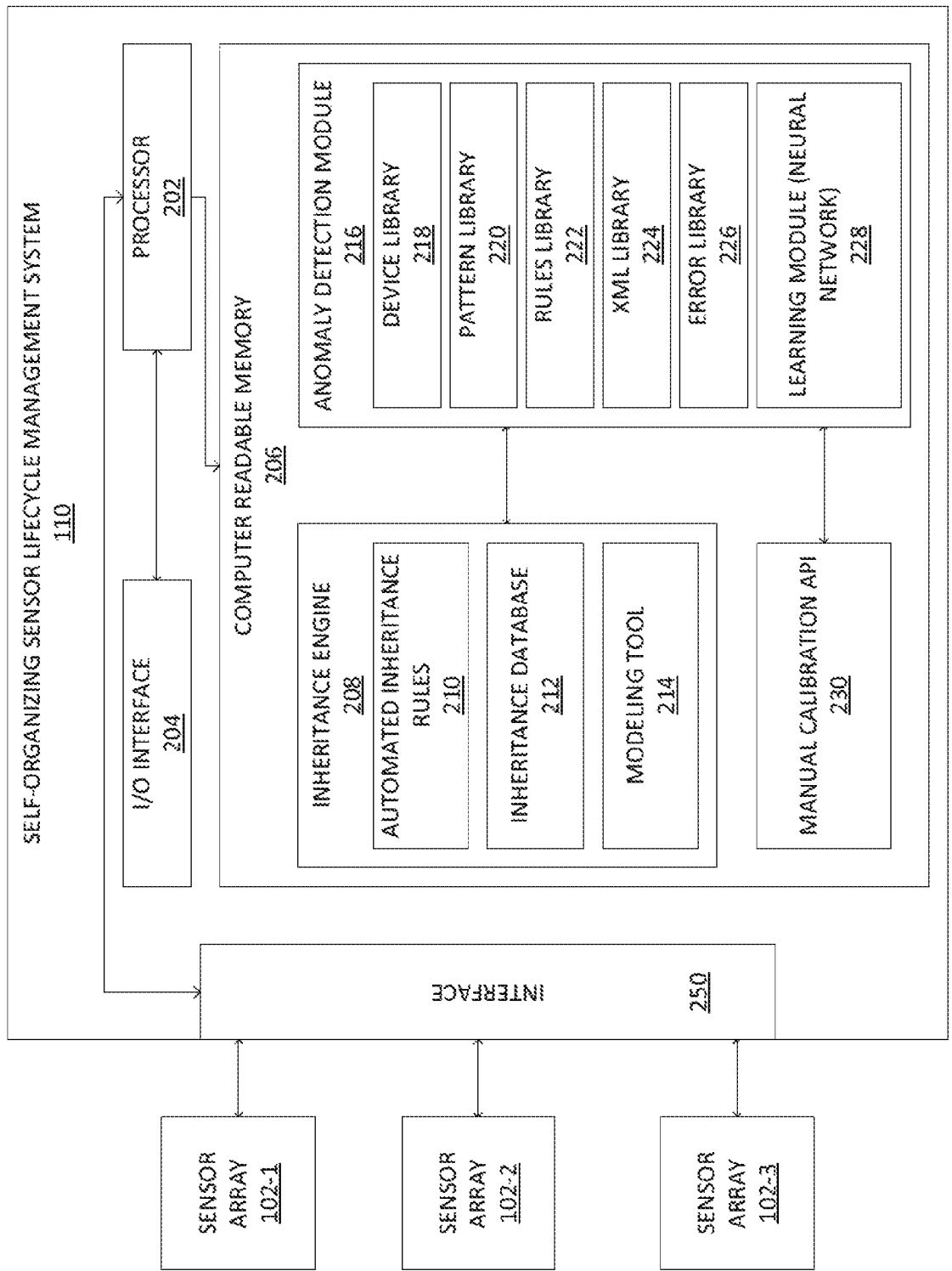
FIG. 3 is a block diagram of an example self-organizing sensor lifecycle management system.

FIG. 3 illustrates a more detailed block diagram of the management system 110. In one example, the sensor arrays 102-1 to 102-N may be in communication with the management system 110 (e.g., via the respective routers 106, as discussed above) via the interface 250.

In one example, the management system 110 may include a manual calibration application programming interface (API) 230. In one example, the inheritance engine 208, the anomaly detection module 216 and the manual calibration API 230 may include instructions that are loaded into the computer readable memory 206 and executed by the processor 202.

In one example, the inheritance engine 208 may include automated inheritance rules database 210, an inheritance database 212 and an inheritance and dependency modeling tool 214 (also referred to herein as modeling tool 214). In one example, the automated inheritance rules database 210 may include rules related to how the sensors 108 should behave for a particular dependency within a particular sensor array 102. In other words, different types of sensors 108 may have different behavioral rules. In addition, the same type of sensor 108 may have different behavioral rules for different sensor arrays 102 due to different SUTs 112 or different dependencies with other sensors 108 within a respective sensor array 102.

In one example, the inheritance database 212 may include a catalogue of each different type of sensor 108. In other words, when a new sensor 108 is added to a sensor array 102, the type of the new sensor 108 may be identified and searched for in the inheritance database 212 to determine what characteristics are associated with the sensor 108. For example, the inheritance database 212 may include various configuration settings, parameter values, and the like, for each type of sensor 108. Alternatively, the SUT 112 may change. The inheritance database 212 may include configuration settings and parameter values for each sensor 108 for different SUTs 112 that the sensors 108 may monitor. For example, if a new model of an appliance is installed that has a new capability (e.g., has hot water and cold water), a single high temperature threshold of a sensor 108 monitoring the water temperature to ensure cold water may no longer be applicable. Rather, the sensor 108 may be reconfigured based on the new SUT to have two temperature thresholds to detect an error (e.g., a high temperature threshold for cold water and a low temperature threshold for hot water).

In one example, the modeling tool 214 may create a dependency model for each sensor array 102, For example, the management system 110 may collect information for each sensor 108 for each sensor array 102 and the SUT 112. The information may include identification information, capability of each sensor 108, a type of sensor 108, and the like. Based on the information, the modeling tool 214 may build a dependency model for the sensor array 102. For example, the dependency model may identify how the behavior, or functioning, of one sensor 108 may affect the behavior, or functioning, of other sensors 108. In one example, the dependency model may be in a form of Relational Data as implemented in existing Relational Database Management System (RDBMS) software.

In one example, the dependency model may be used to calibrate all of the sensors 108 in a sensor array 102 by making an adjustment to a single sensor 108, For example, a single sensor may be calibrated. The calibration to the single sensor 108 may cause neighboring sensors 108 to automatically calibrate in accordance with dependency model that was generated. In this way, the changes may be propagated to each sensor 108 throughout the sensor array 102.

In addition, the use of the dependency model may allow for data fusion of the data collected by the sensors 108. In other words, the management system 110 may not simply collect and track data separately that is collected from each sensor 108 in the sensor array 102. Rather, the data from each sensor may have a dependency on one another. The data collected from different sensors 108 may be "fused" to generate new data based on an analysis of the different data collected by the different sensors 108.

One example of data fusion may be that the humidity and acceptable tolerances in the SUT 112 may be dependent on temperature. Thus, a humidity sensor and a temperature sensor may be correlated (e.g., dependent) on one another. In another example, where sensors 108 are used to optimize traffic flow, traffic sensors (e.g., sensors 108 that measure a number of cars on each street) can be combined with data from a weather sensor and many other sensors (e.g., drones) to generate data to visualize and quantify traffic patterns, expected speeds, perform predictive analysis to prevent bottlenecks, and the like.

In one example, the manual calibration API 230 may be used to manually calibrate the sensors 108. For example, if a new sensor type is added that is not included in the inheritance database 212, the manual calibration API 230 may be used to calibrate or configure the new sensor. The type of sensor and associated configuration settings and parameter values for the calibration may be added to the inheritance database 212 for the same type of sensors 108 that are subsequently added.

In one example, the anomaly detection module 216 may include various libraries and modules for detecting an error or anomaly in each sensor 108. In one example, the anomaly detection module 216 may include a device library 218, a pattern library 220, a rules library 222, an extensible markup language (XML) library 224, an error library 226, and a learning module 228.

In one example, the device library 218 may store specific threshold values for each parameter or event that the sensor 108 is monitoring or tracking and for a particular SUT 112. In other words, different types of sensors 108 may have different threshold values that are stored in the device library 218.

In one example, the pattern library 220 may include patterns of data that may indicate an error or an anomaly. A pattern of data may include a series of data points. In one example, the series of data points may include a predefined number of data points or any number of data points within a sliding window of time (e.g., a 1 minute window). Certain patterns of data may indicate an error or an anomaly with a sensor 108. For example, when the sensor 108 has a historical average of a certain value and the last 10 data points all fall below the historical average, the sensor 108 may have an error or anomaly. In another example, when the last 20 data points form a descending or ascending trend line rather than a steady line, the sensor 108 may have an error or anomaly.

In one example, the rules library 222 may include rules on how a sensor should behave when a threshold is breached or if an error or anomaly is detected. For example, the rules library 222 may include rules for the sensor 108 that has violated the threshold and rules for sensors 108 that are adjacent or neighboring the sensor 108 that violated the threshold.

In one example, the XML library 224 may include XML files of anomalies or errors that have been previously detected. The error library 226 may include a list of errors that are indicative of an error or anomaly for each type of sensor 108.

In one example, the learning module 228 may be used to learn new errors, rules and patterns of data that may indicate a sensor 108 has an error or anomaly. In one example, the learning module 228 may be a neural network.

As a result, the management system 110 may use the inheritance engine 208 and the anomaly detection module 216 to monitor an entire sensor array 102 and not just individual sensors 108. When an error or an anomaly is detected in the sensor array 102, a corrective action may be initiated on multiple sensors 108 simultaneously. For example, the management system 110 may send a single recalibration or reconfiguration instruction to the remote control 104 and the remote control may propagate the instruction to each of the sensors 108 for recalibration or the reconfiguration.

In addition, when new sensors 108 are added or a new SUT 112 is added or changed, the management system 110 may automatically configure the sensors 108. For example, based on a type of new sensor 108 that is installed, the management system 110 may find the configuration for that type of sensor 108 in the inheritance database 212. When an SUT 112 changes (e.g., a new model of an appliance is installed), the management system 110 may automatically change the threshold values for the sensors 108 in the sensor array 102. In other words, the management system 110 may manage the entire lifecycle of all sensors 108 within a sensor array 102 from new installation to changing contexts and removal.

Figure 4:
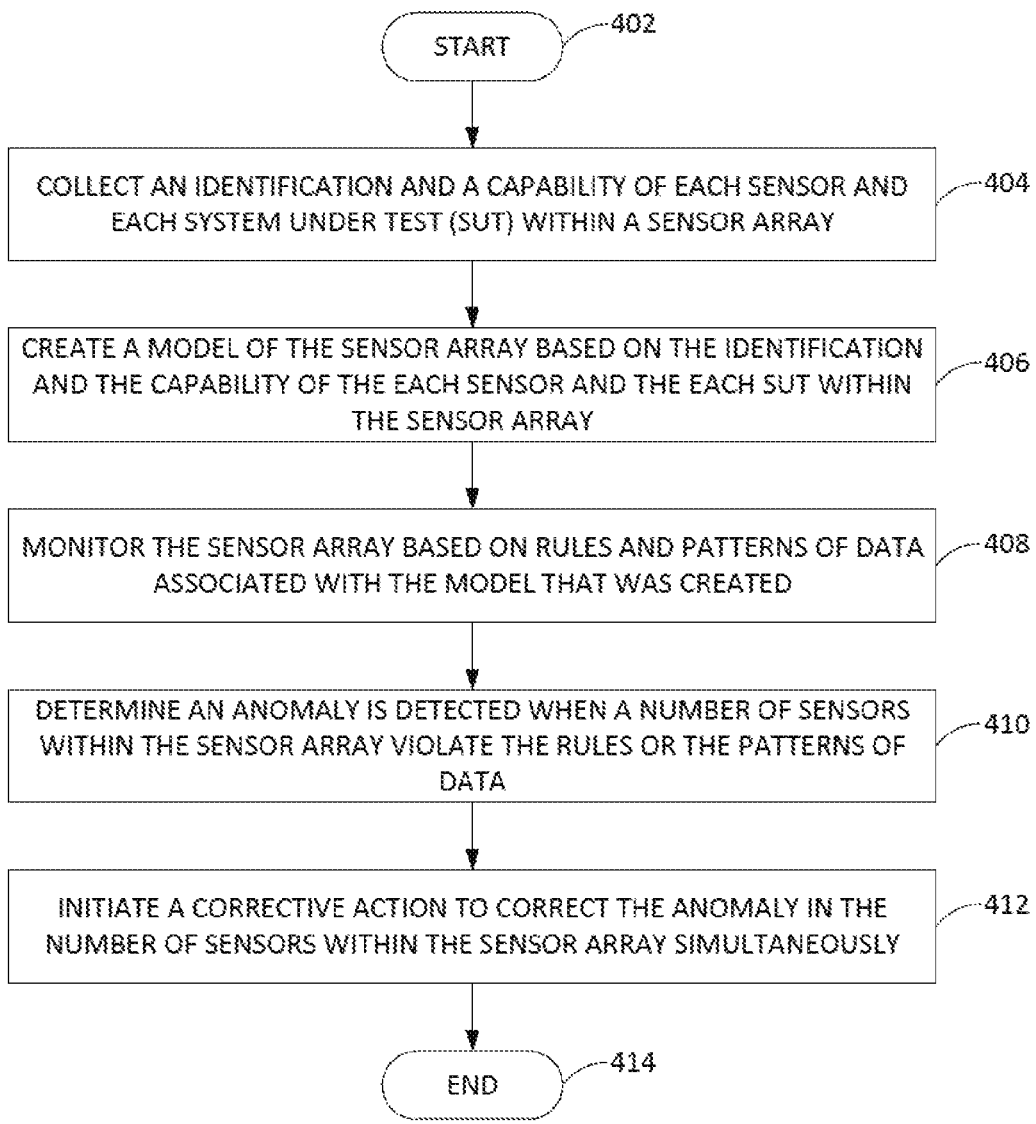
FIG. 4 is a flowchart of an example method for monitoring a sensory array.

FIG. 4 illustrates an example flowchart of a method 400 for monitoring a sensor array. In one example, the method 400 may be performed by the self-organizing sensor life cycle management system 110.

At block 402 the method 400 begins. At block 404, the method 400 collects an identification and a capability of each sensor and each system under test (SUT) within a sensor array. In one example, the capability of each sensor may include a type of sensor, a communication capability, what parameter or event the sensor is monitoring, and the like.

At block 406, the method 400 creates a model of the sensor array based on the identification and the capability of the each sensor and the each SUT within the sensor array. In one example, the identification and the capability of each sensor and the SUT may allow the management system to generate a dependency model of the sensor array. The dependency model may provide information on how each sensor is dependent on another sensor. In other words, the dependency model may provide information on how one sensor may react or rules on what actions the sensor should take when another a new sensor is added or a sensor malfunctions, is changed, is updated, or removed.

At block 408, the method 400 monitors the sensor array based on rules and patterns of data associated with the model that was created. For example, a self-organizing sensor lifecycle management system may communicate with each sensor array via a router and a remote control in the sensor array. Each sensor within the sensor array may provide data to the router locally and the router may pass the data to the remotely located self-organizing sensor lifecycle management system over a wide area network.

At block 410, the method 400 determines an anomaly is detected when a number of sensors within the sensor array violates the rules or the patterns of data. In one example, a percolation threshold may be used to determine that an anomaly or error is detected in the entire array. In other words, some or most of the sensors may be functioning properly, but a few sensors may be malfunctioning causing the entire sensor array to malfunction or provide anomalous data.

In one example, the percolation threshold may be based on a total number of sensors in the sensor array. For example, the larger the sensor array, the larger the percolation threshold and vice versa. In one example, Equation (1) described above may be used to calculate the percolation threshold.

In one example, each individual sensor may be monitored to detect an error, a malfunction or an anomaly. The number of individual sensors that have an error, a malfunction or an anomaly may be accumulated until the percolation threshold is breached to determine an error or an anomaly in the entire sensor array. In one example, the management system may be used to detect an error, a malfunction or an anomaly in the individual sensors. For example, the management system may include various libraries (e.g., a device library, a pattern library, a rules library, an XML library, an error library, or a learning module as described above in FIG. 3) that store various threshold values for each different type of sensor, patterns of data that indicate an anomaly, various errors that detect an error, and the like.

At block 412, the method 400 initiates a corrective action to correct the anomaly in the number of sensors within the sensor array simultaneously. In one example, a single corrective action may be issued by the management system to a remote control in the sensor array via the router in the sensor array. The single corrective action may be, for example, to reconfigure a sensor. Based on the dependency model created in block 406, the adjacent or neighboring sensors may then take an action based on the reconfiguration of the sensor. For example, the adjacent or neighboring sensor may then perform an update or reconfiguration. Subsequently, additional adjacent or neighboring sensors may also take an action and the corrective action may be propagated throughout the entire sensor array.

In another example, the management system may send a corrective action to each sensor simultaneously via the remote control. For example, the management system may have determined that 10 sensors have failed. The management system may send 10 different corrective actions for each one of the 10 sensors. The remote control may then execute the corrective actions sent by the management system for the 10 sensors.

In one example, a corrective action may include, a software update, a reconfiguration, changing a type of sensor due to a change or update of the SUT, adding a new sensor, removing a sensor, adding a threshold, removing a threshold, updating a threshold value, and the like. At block 414, the method 400 ends.

It should be noted that although not explicitly specified, any of the blocks, functions, or operations of the example method 400 described above may include a storing, displaying, and/or outputting block for a particular application. In other words, any data, records, fields, and/or intermediate results discussed in the methods can be stored, displayed, and/or outputted to another device for a particular application.

It will be appreciated that variants of the above-disclosed and other features and functions, or alternatives thereof, may be combined into many other different systems or applications. Various presently unforeseen or unanticipated alternatives, modifications, or variations, therein may be subsequently made which are also intended to be encompassed by the following claims.

The invention claimed is:

1. An apparatus comprising:
an interface to communicate with a sensor array;
an inheritance engine to create a model of the sensor array based on information collected from the each one of a plurality of nodes in the sensor array over the interface, the inheritance engine comprising:
an automated inheritance rules database for storing how each one of the plurality of nodes behave based on a capability of the node;
an inheritance database for storing calibration settings of each node in the sensor array; and
an inheritance and dependency modeling tool that creates the model based on information in the automated inheritance rules database and the inheritance database;
an anomaly detection module to monitor the sensor array in accordance with the model to detect an anomaly and initiate a corrective action to correct the anomaly in two or more of the plurality of nodes within the sensor array simultaneously; and
a processor in communication with the inheritance engine and the anomaly detection module to execute instructions associated with the inheritance engine and the anomaly detection module.

2. The apparatus of claim 1, wherein for each type of node in the sensor array, the anomaly detection module comprises:
a device library for cataloguing an identification of each node of the sensor array;
a pattern library for storing a pattern of data collected from the sensor array based on the model;
a rules library for storing a plurality of rules that the sensor array follows during normal operation based on the model;
an extensible markup language (XML) library storing XML data associated with the sensor array;
an error library for storing different types of errors that indicate a potential failure in the sensor array; and
a learning module for learning new patterns, rules, and errors in the sensor array.

3. The apparatus of claim 2, wherein an anomaly in the sensor array is detected when an anomaly in a number of nodes exceeding a threshold is detected based on a comparison to the pattern library, the rules library, the XML library or the error library.

4. The apparatus of claim 3, wherein the threshold is based on a percolation threshold.

5. The apparatus of claim 1, wherein the each one of the plurality of nodes comprises a sensor or a system under test (SUT).

6. A method, comprising:
collecting, by a processor, an identification and a capability of each sensor and each system under test (SUT) within a sensor array;
creating, by the processor, a model of the sensor array based on the identification and the capability of the each sensor and the each SUT within the sensor array, wherein the model of the sensor array is created using an automated inheritance rules database for storing how each one of the plurality of nodes behave based on a capability of the node, an inheritance database for storing calibration settings of each node in the sensor array, and an inheritance and dependency modeling tool that creates the model based on information in the automated inheritance rules database and the inheritance database;

monitoring, by the processor, the sensor array based on rules and patterns of data associated with the model that was created;

determining, by the processor, an anomaly is detected when a number of sensors within the sensor array violates the rules or the patterns of data; and initiating, by the processor, a corrective action to correct the anomaly in the number of sensors within the sensor array simultaneously.

7. The method of claim 6, wherein the sensor array comprises a plurality of different sensor arrays.

8. The method of claim 7, wherein the rules and the patterns of data associated with the model that is created for each one of the plurality of different sensor arrays are different.

9. The method of claim 8, wherein the corrective action comprises changing a configuration parameter, changing an operational threshold value, recalibrating a sensor, or changing the rules and the patterns of data for the model based on a change in context of an SUT.

* * * * *